United States Patent
Subbiah et al.

(10) Patent No.: US 11,206,468 B2
(45) Date of Patent: Dec. 21, 2021

(54) FIBRE CHANNEL FORWARDER FAILOVER AND LOAD BALANCING SYSTEM

(71) Applicant: Dell Products L.P., Round Rock, TX (US)

(72) Inventors: Ramesh Kumar Subbiah, Chennai (IN); Vibin Varghese, Tamil Nadu (IN)

(73) Assignee: Dell Products L.P., Round Rock, TX (US)

( * ) Notice: Subject to any disclaimer, the term of this patent is extended or adjusted under 35 U.S.C. 154(b) by 214 days.

(21) Appl. No.: 16/569,483

(22) Filed: Sep. 12, 2019

(65) Prior Publication Data
US 2021/0084394 A1    Mar. 18, 2021

(51) Int. Cl.
  *H04Q 11/00*  (2006.01)
  *G06F 11/20*  (2006.01)
  *H04B 10/03*  (2013.01)
  *H04B 10/25*  (2013.01)

(52) U.S. Cl.
  CPC ..... *H04Q 11/0062* (2013.01); *G06F 11/2007* (2013.01); *H04B 10/03* (2013.01); *H04B 10/25891* (2020.05); *H04Q 2011/0081* (2013.01); *H04Q 2011/0086* (2013.01)

(58) Field of Classification Search
  CPC .................................................. H04Q 11/0062
  See application file for complete search history.

(56) References Cited

U.S. PATENT DOCUMENTS

| | | | |
|---|---|---|---|
| 9,588,920 B1* | 3/2017 | Anand | G06F 13/36 |
| 2010/0085981 A1* | 4/2010 | Gupta | H04L 45/245 |
| | | | 370/419 |
| 2018/0331977 A1* | 11/2018 | Krishnasamy | H04L 67/1097 |

* cited by examiner

*Primary Examiner* — Shi K Li
(74) *Attorney, Agent, or Firm* — Joseph Mencher

(57) ABSTRACT

A Fibre Channel Forwarder (FCF) routing system includes a target device coupled to a Fibre Channel (FC) networking device via a first link, and a Fibre Channel Forwarder (FCF) device that is coupled to an initiator device via a second link, the FC networking device via a third link that is mapped to the second link, and the FC networking device via a fourth link that is mapped to the second link. The FCF device receives, via the second link, first traffic that originates from the initiator device and that is addressed to the target device. The FCF device determines, using an initiator device identifier included in the first traffic and a link mapping table, that the third link and the fourth link are mapped to the second link on which the first traffic was received and load balances the first traffic between the third link and the fourth link.

17 Claims, 13 Drawing Sheets

FIBRE CHANNEL FORWARDER FAILOVER AND LOAD BALANCING SYSTEM

BACKGROUND

The present disclosure relates generally to information handling systems, and more particularly to providing failover and load balancing for Fibre Channel Forwarder (FCF) traffic transmitted by information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems are configured to provide a Fibre Channel (FC) Storage Area Network (SAN) for the storage of data. In such systems, an FC switch device may be utilized to couple the FC SAN to server devices via a Fibre Channel Forwarder (FCF) device that performs FC over Ethernet (FCoE)-to-FC protocol conversions on Ethernet communications sent from the server devices to the FC SAN, as well as FC-to-FCoE protocol conversions on FC communications sent from the FC SAN to the server devices. Such FCF devices allow server devices that communicate via the Ethernet protocol to utilize FC SANs that communicate via the FC protocol. However, the conventional functionality of such FCF devices raises a number of issues.

For example, servers in such systems may utilize a Converged Network Adapter (CNA) to communicate with an N_Port ID Virtualization (NPIV) Proxy Gateway (NPG) provided by the FCF device in order to provide login communication for logging into the FC SAN, with the FCF device converting those login communications and the NPG providing them to the FC switch device in order to log the server device into the FC SAN. After logging server devices into the FC SAN, the FCF device may forward traffic from those server devices to the FC switch device. The FC switch device may then route the traffic to the FC SAN using Fibre Channel identifiers (FCIDs) that are included in the traffic and that were assigned to the node ports (N_Ports) on the server devices and the FCF device during fabric login. In conventional systems, if the link between the FCF device and the FC switch to which a server device is logged into fails, then the login session for that server deice gets torn down and re-established using another link between the FCF device and the FC switch. This process of re-establishing the login session for the server device is disruptive, as the server device must re-initiate the login and Logical Unit Number (LUN) discovery. While many links may be available between the FCF device and the FC switch, the login session for the server device must be taken down completely when the link through which that server device logged into goes down. Furthermore, traffic from a particular server device may only be transmitted via the uplink which that server device used to log in, which results in under-utilization of available bandwidth. Some systems solve such bandwidth issues by using proprietary Fibre Channel Trunking to group together multiple links between the FCF device and the FC switch as a single logical connection, but current trunking techniques have various limitations. For example, all links of a trunk group are required to have the same speed, and the ports that provide the links need to be from the same Application Specific Integrated Circuit (ASIC).

Accordingly, it would be desirable to provide an improved FCF device failover and load balancing system.

SUMMARY

According to one embodiment, an Information Handling System (IHS) includes a communication subsystem that is coupled to: an initiator device via first link; a Fibre Channel (FC) networking device via a second link that is mapped to the first link; and the FC networking device via a third link that is mapped to the first link; a processing system coupled to the communication subsystem; and a memory system that is coupled to the processing system and that includes instructions that, when executed by the processing system, cause the processing system to provide a link proxy engine that is configured to: receive, via the first link, first traffic that originates from the initiator device and that is addressed to a target device coupled to the FC networking device via a fourth link; determine, using an initiator device identifier included in the first traffic and a link mapping table, that the second link and the third link are mapped to the first link on which the first traffic was received; and load balance the first traffic between the second link and the third link.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
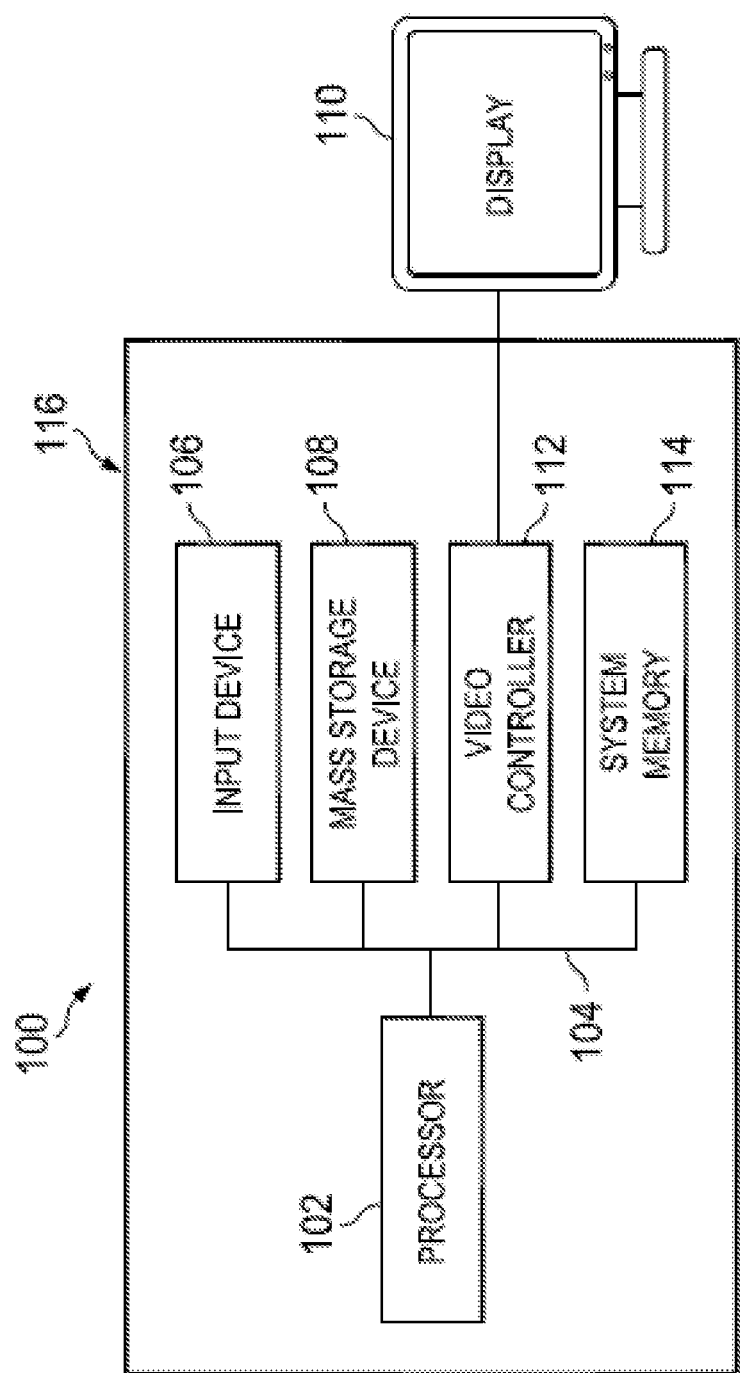
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
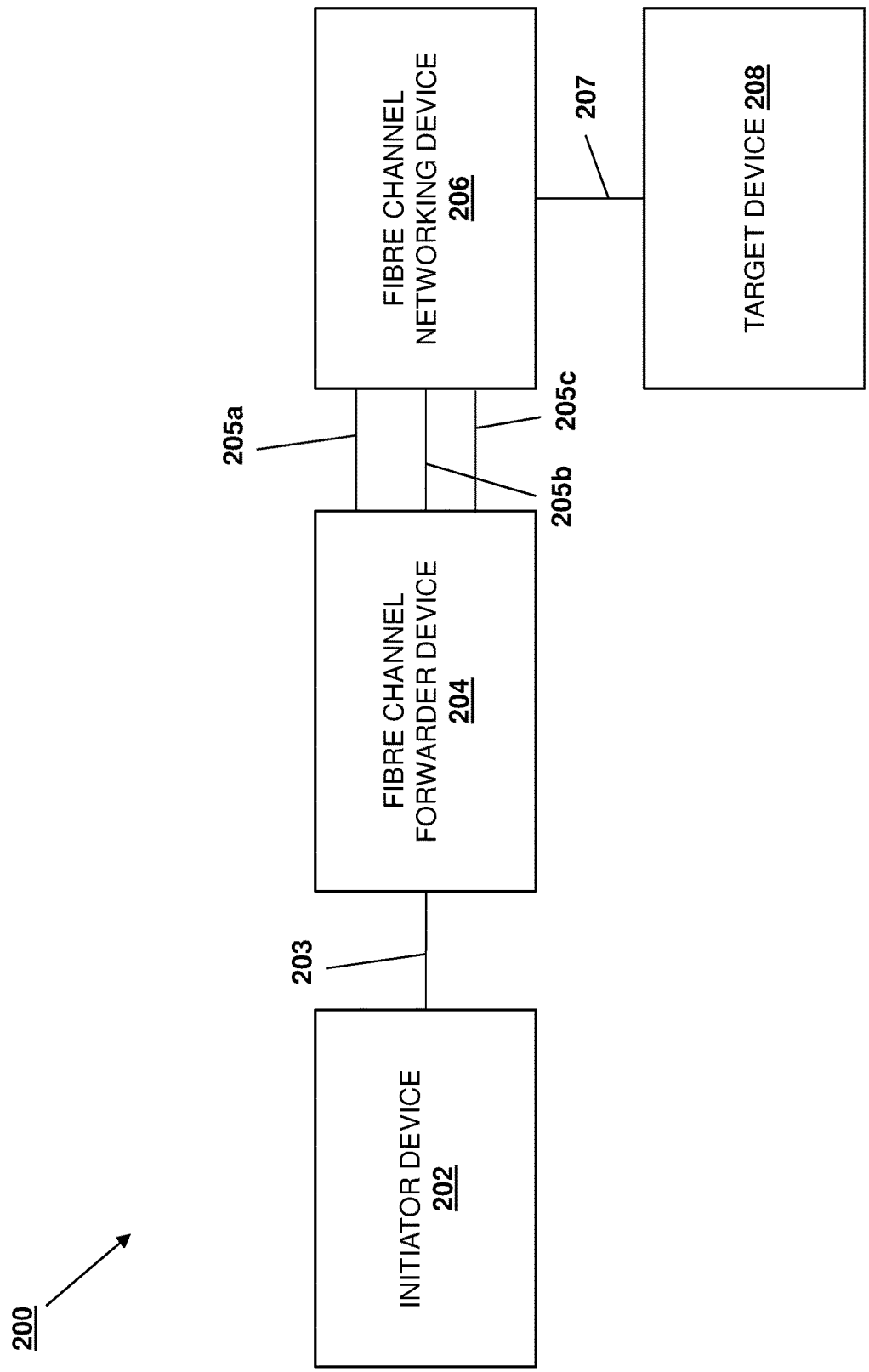
FIG. 2 is a schematic view illustrating an embodiment of a Fibre Channel Forwarder (FCF) device failover and load balancing system.

Referring now to FIG. 2, an embodiment of a Fibre Channel Forwarder (FCF) failover and load balancing system 200 is illustrated. In the illustrated embodiment, the FCF failover and load balancing system 200 includes an initiator device 202 that may be provided by the IHS 100 discussed above with reference to FIG. 1 and/or that may include some or all of the components of the IHS 100. For example, the initiator device 202 may be one or more servers in a server rack or server chassis, and one of skill in the art in possession of the present disclosure will recognize that any number of initiator devices may be provided in the FCF failover and load balancing system 200 and may operate similarly to the initiator devices discussed below. In the illustrated embodiment, the initiator device 202 is coupled by a link (e.g., a link 203) to a Fibre Channel Forwarder (FCF) device 204 that may be provided by the IHS 100 discussed above with reference to FIG. 1 and/or that may include some or all of the components of the IHS 100. For example, the FCF device 204 may be provided by a switch or other networking device that is configured to receive Ethernet communications from the initiator device 202, convert those Ethernet communications to Fibre Chanel (FC) communications for forwarding to an FC Storage Area Network (SAN), receive FC communications from the FC SAN, convert those FC communications to Ethernet communications for forwarding to the initiator device 202, and/or perform other FCF device functionality that would be apparent to one of skill in the art in possession of the present disclosure.

In the illustrated embodiment, the FCF device 204 is coupled by a plurality of links (e.g., a link 205a, a link 205b, and up to a link 205c) to an FC networking device 206 that may be provided by the IHS 100 discussed above with reference to FIG. 1 and/or that may include some or all of the components of the IHS 100. For example, the FC networking device 206 may be provided by an FC switch that is configured to receive FC communications (e.g., initialed by the initiator device 202) from the FCF device 204, log the initiator device 202 into an FC fabric, subsequently receive and transmit FC communications (e.g., initialed by the initiator device 202) from the FCF device 204 to allow the initiator device 202 to communicate with the target devices in FC fabric (e.g., Storage Area Network (SAN) devices), and perform a variety of other FC networking device functionality that would be apparent to one of skill in the art in possession of the present disclosure. In the illustrated embodiment, the FC networking device 206 is coupled by a link (e.g., a link 207) to a target device 208 that may be provided by the IHS 100 discussed above with reference to FIG. 1 and/or that may include some or all of the components of the IHS 100. For example, the target device 208 may be provided by an FC storage system that provides an FC SAN that is configured to receive FC communications from the initiator device 202 through the FC networking device 206, send FC communications to the initiator device 202 through the FC networking device 206, and/or perform a variety of other FC storage system functionality that would be apparent to one of skill in the art in possession of the present disclosure. While a specific FCF failover and load balancing system 200 is illustrated and described below, one of skill in the art in possession of the present disclosure will recognize that the teachings of the present disclosure will be beneficial for a variety of FC systems that would be apparent to one of skill in the art in possession of the present disclosure and, as such, a wide variety of modifications to the number, types, and configuration of devices in the FCF failover and load balancing system 200 will fall within the scope of the present disclosure as well.

Figure 3:
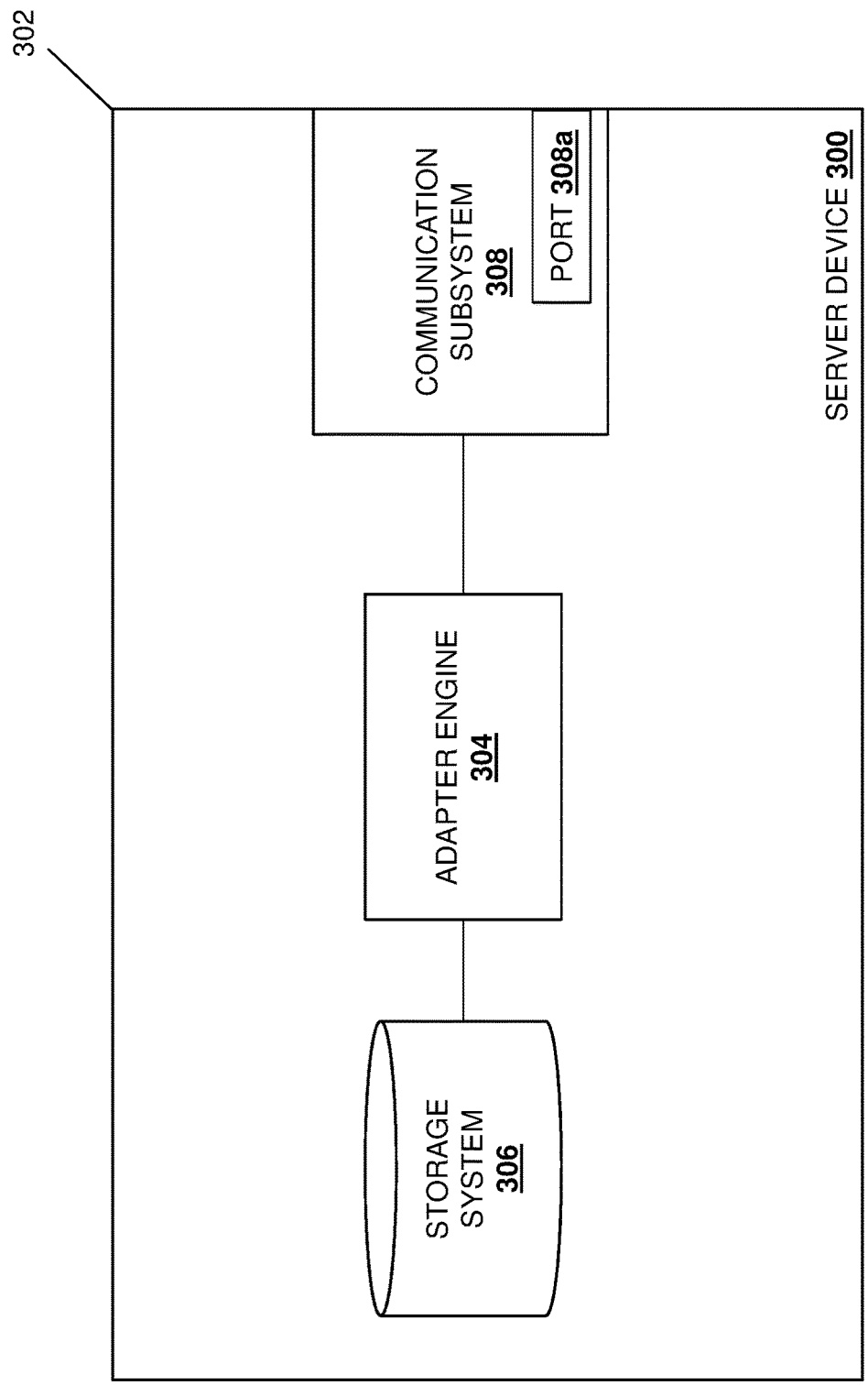
FIG. 3 is a schematic view illustrating an embodiment of a target device that may be provided in the FCF device local routing system of FIG. 2.

Referring now to FIG. 3, an embodiment of an initiator device 300 is illustrated that may be the initiator device 202 discussed above with reference to FIG. 2. As such, the initiator device 300 may be provided by the IHS 100 discussed above with reference to FIG. 1 and/or may include some or all of the components of the IHS 100, and in specific examples may include one or more server devices in a server rack or server chassis. In the illustrated embodiment, the initiator device 300 includes a chassis 302 that houses the components of the initiator device 300, only some of which are illustrated in FIG. 3. For example, the chassis 302 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an adapter engine 304 that is configured to perform the functions of the adapter engines and initiator devices discussed below.

The chassis 302 may also house a storage system (not illustrated, but which may include the storage device 108 discussed above with reference to FIG. 1) that is coupled to the adapter engine 304 (e.g., via a coupling between the storage system and the processing system) and that may include a storage subsystem 306 that is configured to store the data utilized as discussed below. However, in some embodiments the storage subsystem 306 may be omitted. The chassis 302 may also house a communication subsystem 308 that is coupled to the adapter engine 304 (e.g., via a coupling between the communication subsystem 308 and the processing system) and that may include a Network Interface Controller (NIC), a wireless communication devices, one or more ports (e.g., a port 308a illustrated in FIG. 3), and/or other communication components that would be apparent to one of skill in the art in possession of the present disclosure. Furthermore, in some embodiments, components of the adapter engine 304 and/or the communication subsystem 308 may be provided by a Converged Network Adapter (CNA) that performs the functionality of the adapter engines and/or initiator devices discussed below. However, in other embodiments, the adapter engine 304 and/or communication subsystem 308 may be utilized to provide other types of adapters (e.g., Host Bus Adapters (HBAs)) while remaining within the scope of the present disclosure. While a specific initiator device 300 has been described, one of skill in the art in possession of the present disclosure will recognize that the initiator device 300 may include a variety of other components that perform conventional initiator device functionality, as well as the functionality described below, while remaining within the scope of the present disclosure.

Figure 4:
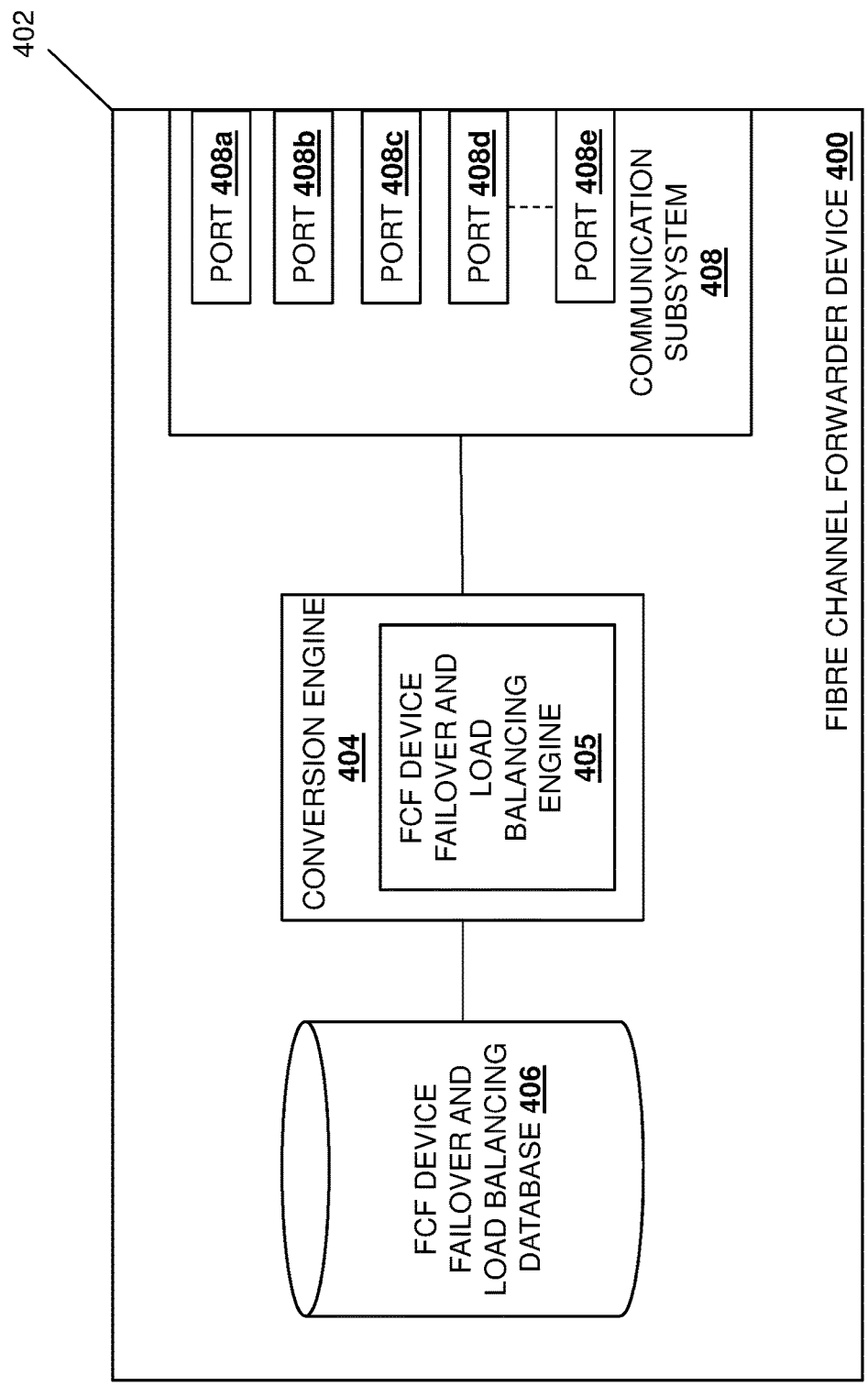
FIG. 4 is a schematic view illustrating an embodiment of an FCF device that may be provided in the FCF device failover and load balancing system of FIG. 2.

Referring now to FIG. 4, an embodiment of a Fibre Channel Forwarder (FCF) device 400 is illustrated that may be the FCF device 204 discussed above with reference to FIG. 2. As such, the FCF device 400 may be provided by the IHS 100 discussed above with reference to FIG. 1 and/or may include some or all of the components of the IHS 100, and in specific examples may be provided by a switch, a gateway, and/or other networking device that would be apparent to one of skill in the art in possession of the present disclosure. In the illustrated embodiment, the FCF device 400 includes a chassis 402 that houses the components of the FCF device 400, only some of which are illustrated in FIG. 4. For example, the chassis 402 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an conversion engine 404 that is configured to perform the functions of the conversion engines and FCF devices discussed below. In a specific example, the conversion engine 404 may include an N_Port ID Virtualization (NPIV) Proxy Gateway (NPG) engine that operates as discussed below, although other conversion engines may fall within the scope of the present disclosure as well. In the illustrated example, the conversion engine 404 includes an FCF device failover and load balancing engine 405 that is configured to perform the functions of the FCF device failover and load balancing engines and FCF devices discussed below such as, e.g., mapping a plurality of links between the FCF device 400 and an FC networking device 206 to a link between the FCF device 400 and the initiator device 202, balancing traffic through those mapped links, and providing a failover mechanism in the event that one the links between the FCF device 400 and the FC networking device 206 fails or otherwise becomes unavailable.

The chassis 402 may also house a storage system (not illustrated, but which may include the storage device 108 discussed above with reference to FIG. 1) that is coupled to the conversion engine 404 (e.g., via a coupling between the storage system and the processing system) and that may include an FCF device failover and load balancing database 406 that is configured to store the data utilized as discussed below. The chassis 402 may also house a communication subsystem 408 that is coupled to the conversion engine 404 (e.g., via a coupling between the communication subsystem 408 and the processing system) and that may include a Network Interface Controller (NIC), a wireless communication devices, ports, and/or other communication components that would be apparent to one of skill in the art in possession of the present disclosure. For example, in the illustrated embodiment, the communication subsystem 408 includes a plurality of ports (e.g., the ports 408a, 408b, 408c, 408d, and up to 408e) that may be coupled to an FC networking device, another FCF device, and/or an initiator device as discussed below. Furthermore, in some embodiments, components of the conversion engine 404 and/or the communication subsystem 408 may provide an NPG that performs the functionality of the conversion engines and/or FCF devices discussed below. However, as discussed above, the conversion engine 404 may be utilized to provide for other types of conversions while remaining within the scope of the present disclosure as well. While a specific FCF device 400 has been described, one of skill in the art in possession of the present disclosure will recognize that the FCF devices may include a variety of other components that perform conventional FCF device functionality, as well as the functionality described below, while remaining within the scope of the present disclosure.

Figure 5:
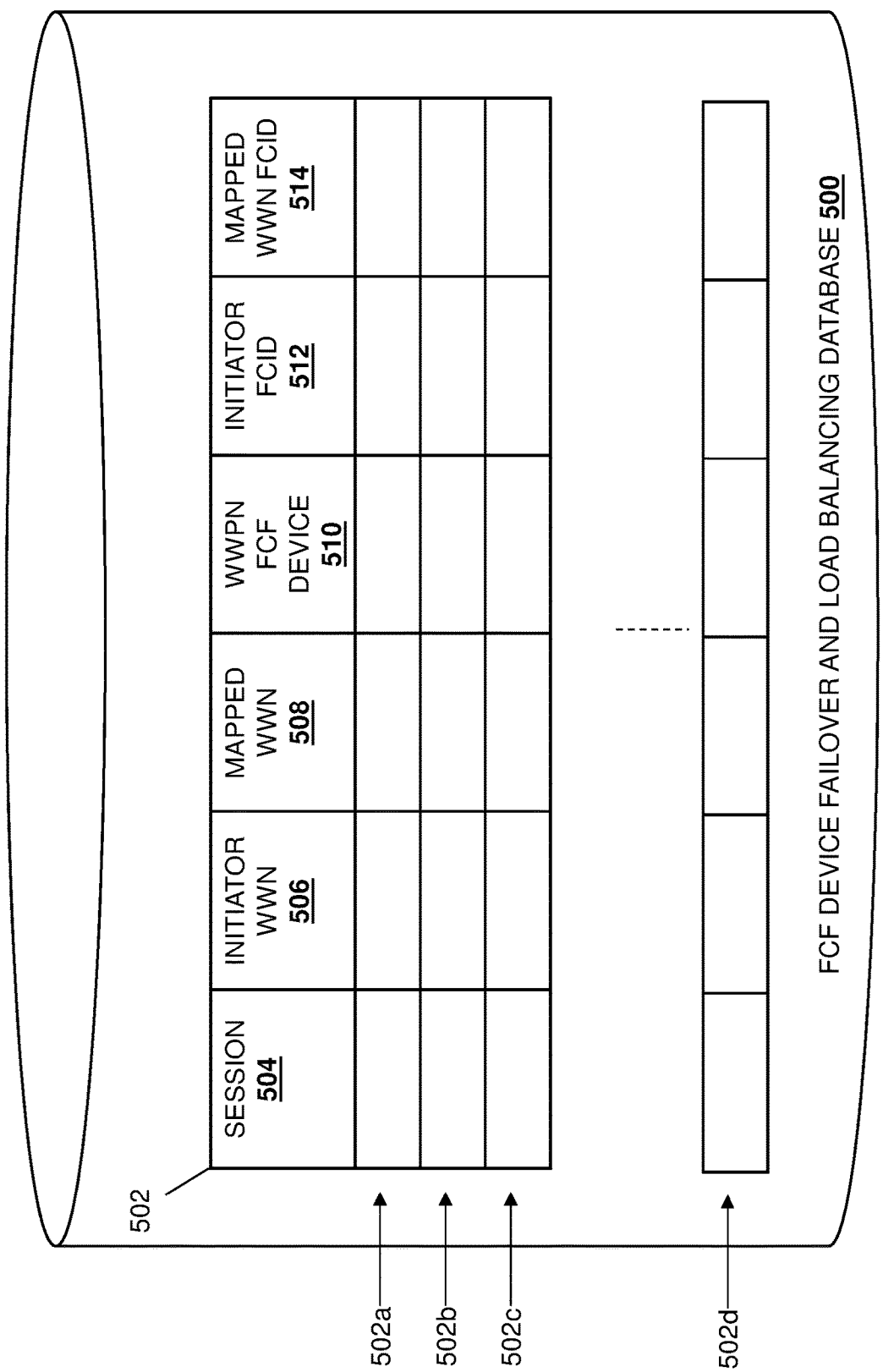
FIG. 5 is a schematic view illustrating an embodiment of an FCF device failover and load balancing database that may be provided in the FCF device of FIG. 4.

Referring now to FIG. 5, an embodiment of an FCF device failover and load balancing database 500 is illustrated. In an embodiment, the FCF device failover and load balancing database 500 may be the FCF device failover and load balancing database 406 discussed above with reference to FIG. 4. In the illustrated example, the FCF device failover and load balancing database 500 includes an FCF device link mapping table 502 having FCF device link mapping table entries 502a, 502b, 502c, and up to 502d. For example, for each FCF device link mapping table entry 502a-d, the FCF device link mapping table 502 may include a session identifier column 504, an initiator World Wide Name (WWN) column 506 (e.g., a port WWN, or other identifier of the port) a mapped WWN column 508, a WWPN FCF device column 510 for a port on the FCF device 204 that provides the link to the FC networking device 206, an initiator FCID column 512, and a mapped WWN FCID column 514. However, one of skill in the art in possession of the present disclosure will recognize that the FCF device failover and load balancing database 500 and/or the FCF device link mapping table 502 may include and/or store other information to enable the functionality discussed below while remaining within the scope of the present disclosure.

Figure 6:
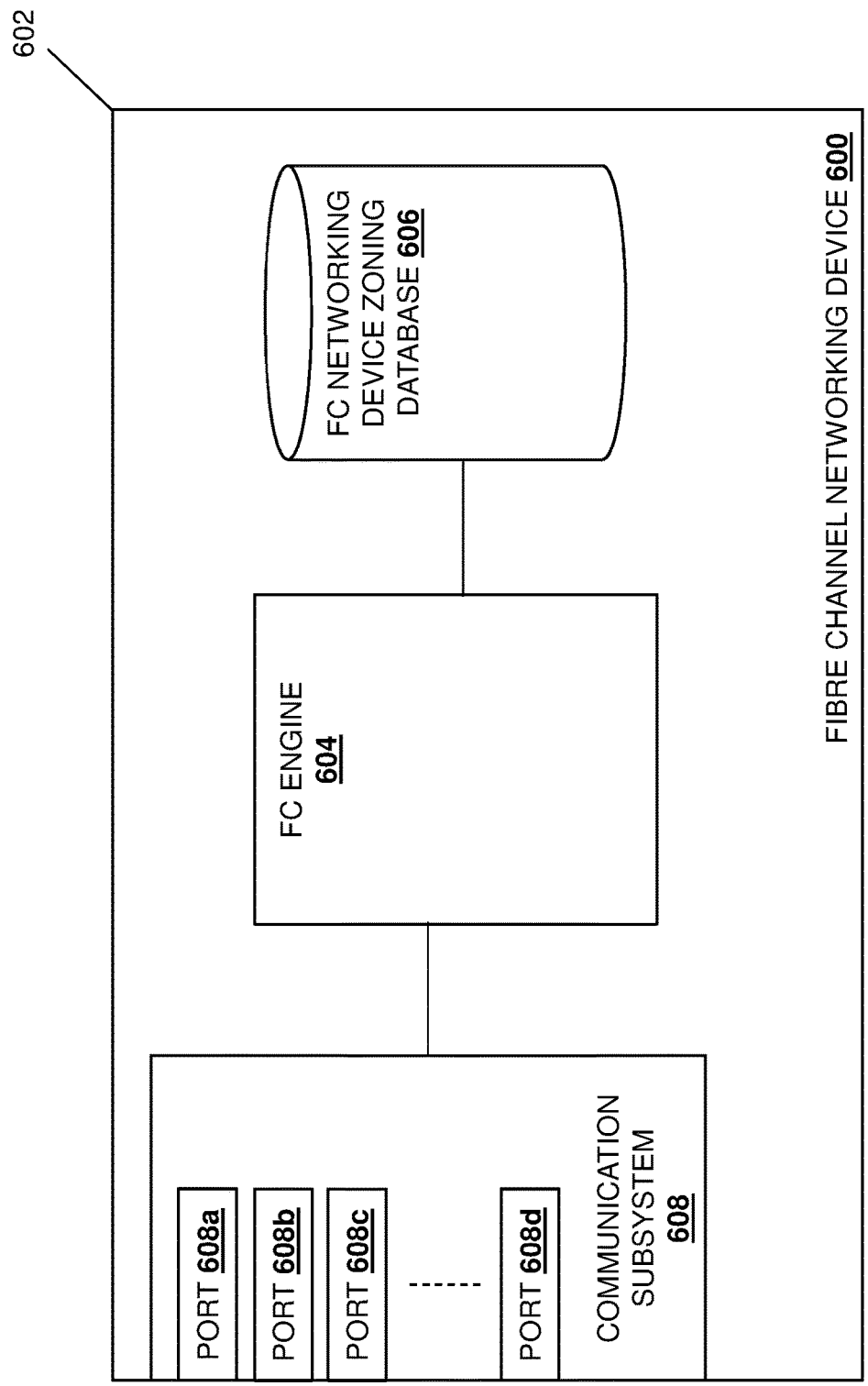
FIG. 6 is a schematic view illustrating an embodiment of a Fibre Channel (FC) networking device that may be provided in the FCF device failover and load balancing system of FIG. 2.

Referring now to FIG. 6, an embodiment of a Fibre Channel (FC) networking device 600 is illustrated that may be the FC networking device 206 discussed above with reference to FIG. 2. As such, the FC networking device 600 may be provided by the IHS 100 discussed above with reference to FIG. 1 and/or may include some or all of the components of the IHS 100, and in specific examples may be provided by an FC switch. In the illustrated embodiment, the FC networking device 600 includes a chassis 602 that houses the components of the FC networking device 600, only some of which are illustrated in FIG. 6. For example, the chassis 602 may house a processing system (not illustrated, but which may include the processor 102 discussed above with reference to FIG. 1) and a memory system (not illustrated, but which may include the system memory 114 discussed above with reference to FIG. 1) that includes instructions that, when executed by the processing system, cause the processing system to provide an FC engine 604 that is configured to perform the functions of the FC engines and FC networking devices discussed below.

The chassis 602 may also house a storage system (not illustrated, but which may include the storage device 108 discussed above with reference to FIG. 1) that is coupled to the FC engine 604 (e.g., via a coupling between the storage system and the processing system) and that may include an FC networking device zoning database 606 that is configured to store the zoning data utilized as discussed below. The chassis 602 may also house a communication subsystem 608 that is coupled to the FC engine 604 (e.g., via a coupling between the communication subsystem 608 and the processing system) and that may include a Network Interface Controller (NIC), a wireless communication devices, ports, and/or other communication components that would be apparent to one of skill in the art in possession of the present disclosure. For example, in the illustrated embodiment, the communication subsystem 608 includes a plurality of ports 608a, 608b, 608c and up to 608d, some of which may be coupled to the FCF device 204 and the target device 208, as discussed herein. While a specific FC networking device 600 has been described, one of skill in the art in possession of the present disclosure will recognize that the FC networking device 600 may include a variety of other components that perform conventional FC networking device functionality, as well as the functionality described below, while remaining within the scope of the present disclosure.

Figure 7:
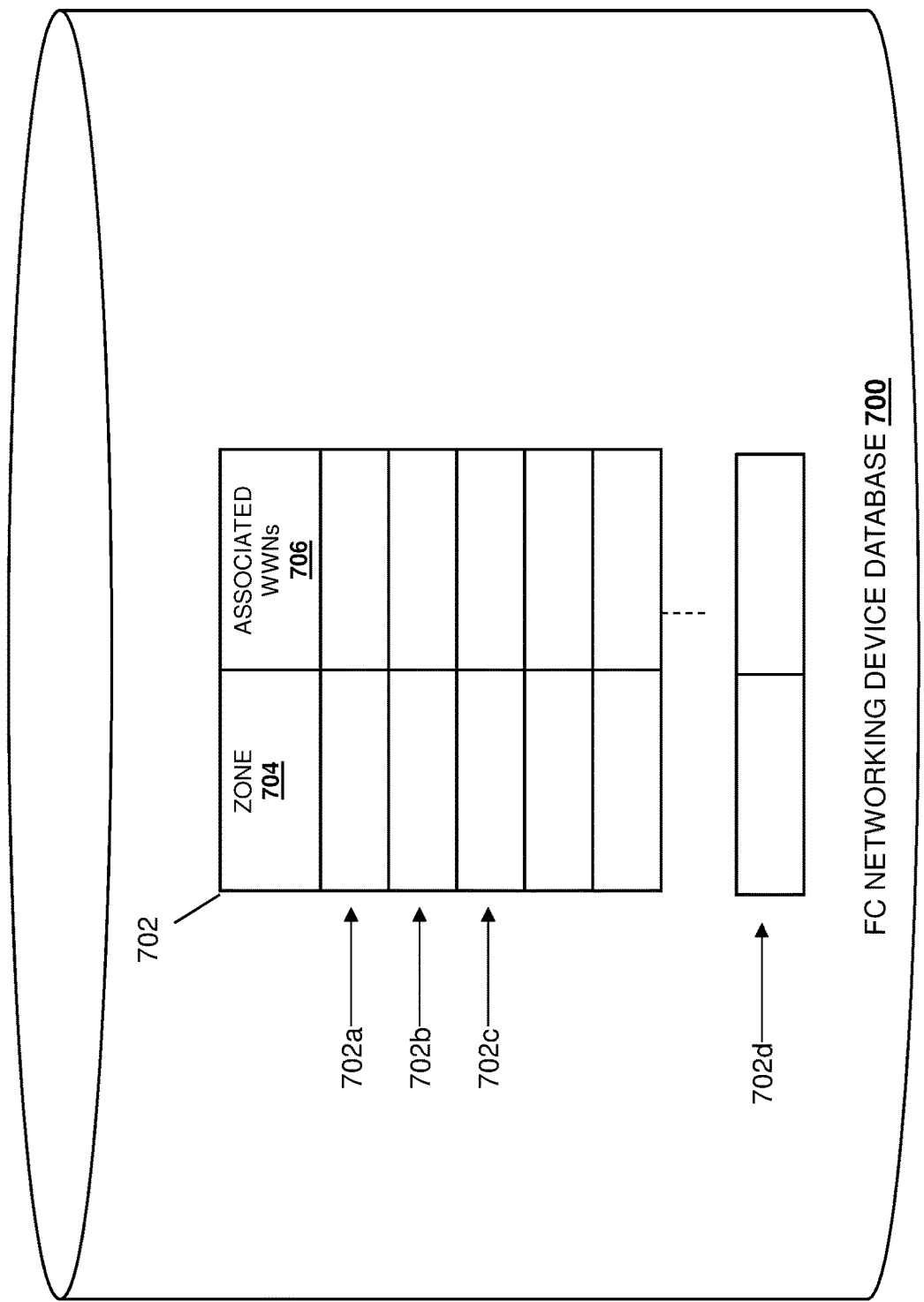
FIG. 7 is a schematic view illustrating an embodiment of an FC networking device zoning database that may be provided in the FC networking device of FIG. 6.

Referring now to FIG. 7, an embodiment of an FC networking device zoning database 700 is illustrated. In an embodiment, the FC networking device zoning database 700 may be the FC networking device zoning database 606 discussed above with reference to FIG. 6. In the illustrated example, the FC networking device zoning database 700 includes an FCF networking device zoning table 702 having FC networking device zoning table entries 702a, 702b, 702c, and up to 702d. For example, for each active zone table entry 702a-702d, the FCF networking device zoning table 702 may include a zone column 704, an associated WWN column 706, and/or other information columns that would be apparent to one of skill in the art in possession of the present disclosure. As discussed below, the FCF networking device zoning table 702 may provide mappings of a zone to initiator device identifiers (e.g., WWNs and, in some cases, FCIDs) that are associated with that zone, and target device identifiers that are associated with that zone. As will be appreciated by one of skill in the art in possession of the present disclosure, the zone may provide an indication of which initiator devices and target devices may communicate with each other. However, while a specific example of the FC networking device zoning database 700 is illustrated, one of skill in the art in possession of the present disclosure will recognize that the FC networking device zoning database 700 and/or the FCF networking device zoning table 702 may include and/or store other information to enable the functionality discussed below while remaining within the scope of the present disclosure.

Figure 8:
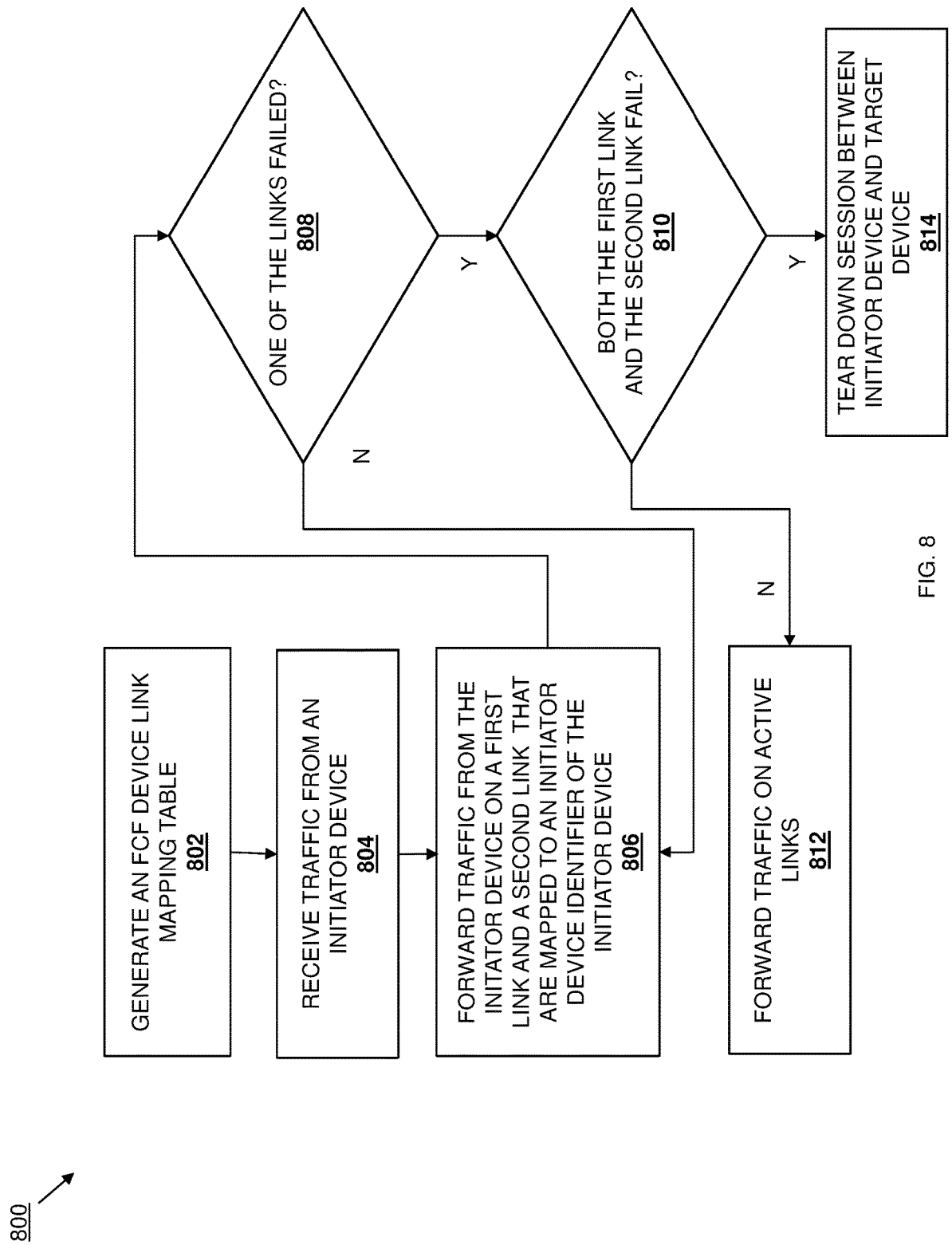
FIG. 8 is a flow chart illustrating an embodiment of a method for providing failover and load balancing for FCF traffic.

Referring now to FIG. 8, an embodiment of a method 800 for providing FCF device link failover and load balancing is illustrated. As discussed above, conventional FCF devices forward traffic on a link to an FC networking device, or forward traffic on trunk groups that require ports to be on the same application specific integrated circuit (ASIC) and have the same speed. As such, enode sessions on a single link may be torn down if the link fails, requiring the initiator devices to perform a target device login process via a different link between the FCF device and the FC switch. In addition, providing the enode session on a single link underutilizes bandwidth between the FCF device and the FC networking device when there are multiple physical links between the FCF device and the FC networking device. The systems and methods of the present disclosure provide an FCF device that provides failover and load balancing for an enode session via an FCF device that maps a plurality of links between the FCF device and the FC networking device to the link between the FCF device and the initiator device. The initiator device may be unaware of these mappings, and the FCF device may generate mapped WWNs for the plurality of links that act as proxies for the WWNs (e.g., a World Wide Port Name (WWPN) and a World Wide Node Name (WWNN)) for the initiator device. The FCF device may then use the mapped WWNs to log each link between the FCF device and the FC networking device, which are to be mapped to the link between the FCF device and the initiator device, into the Fiber Channel network and ultimately log each link between the FCF device and the FC networking device into the target device identified in a FLOGI sent by the initiator device. The FCF devices may then snoop messages and responses it receives during the FC login process, and updates them with link mapping information stored in a FCF device link mapping table.

As such, the FCF device may provide traffic between the initiator device and the target device via a plurality of links between FCF device and the FC networking device without those links requiring the same speed, or being provided by ports belonging on the same ASIC. The traffic may be load balanced on the plurality of links between FCF device and the FC networking device that are mapped to the link between the FCF device and the initiator device, and in the event one of the links between FCF device and the FC networking device fails, the FCF device may use the FCF device link mapping table to route the traffic on the remaining links between FCF device and the FC networking device that are mapped to the link between the FCF device and the initiator device. Using the FCF devices in such a manner decreases latency of the traffic being transmitted, alleviates congestion on the links between the FC networking device and the FCF device, utilizes bandwidth more efficiently, and provides other benefit that would be apparent to one of skill in the art in possession of the present disclosure.

Figure 9:
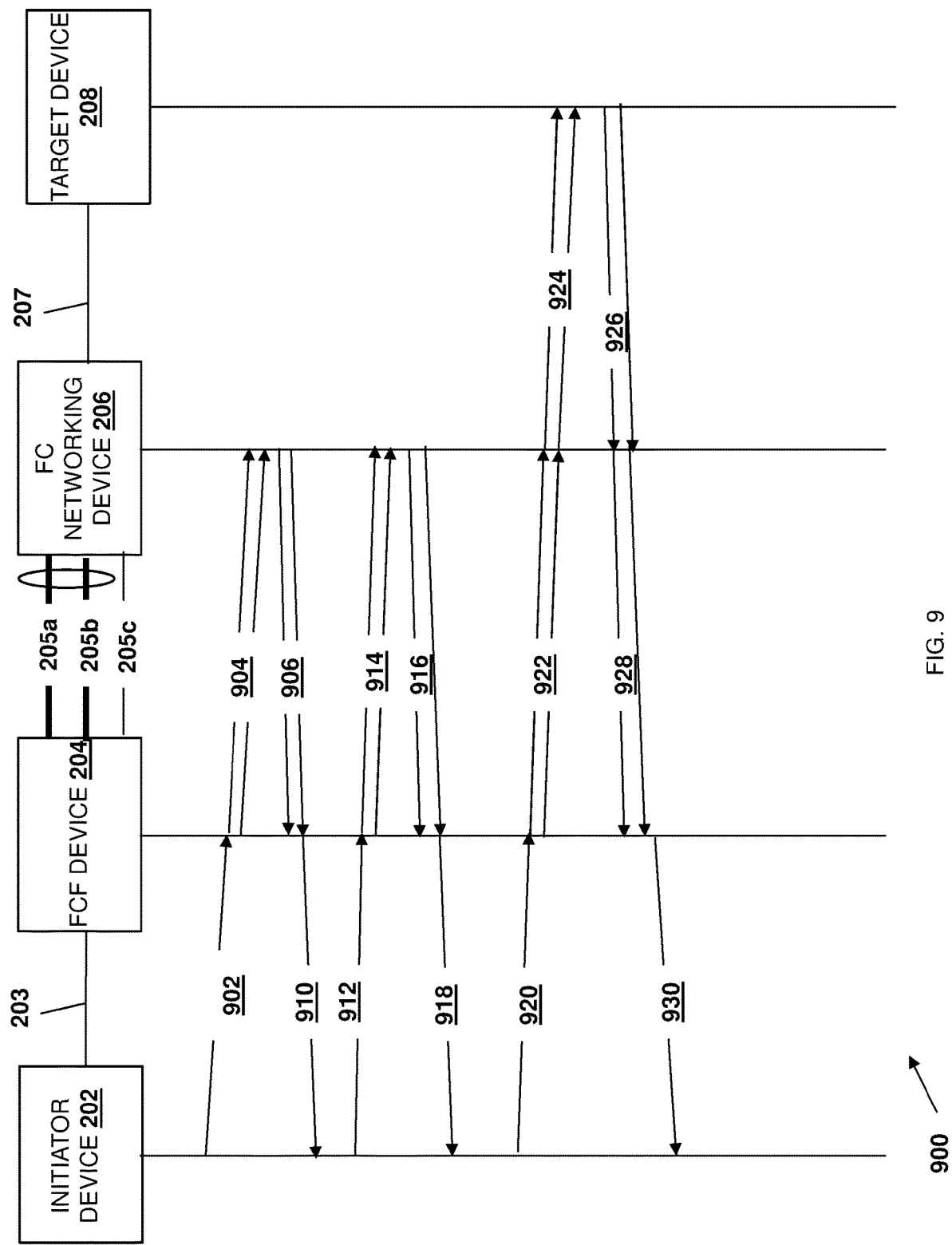
FIG. 9 is a communication diagram illustrating an embodiment of the generation of FCF device link mapping tables that may be used by FCF devices in the FCF device failover and load balancing system of FIG. 2 in the method of FIG. 8.
Figure 10A:
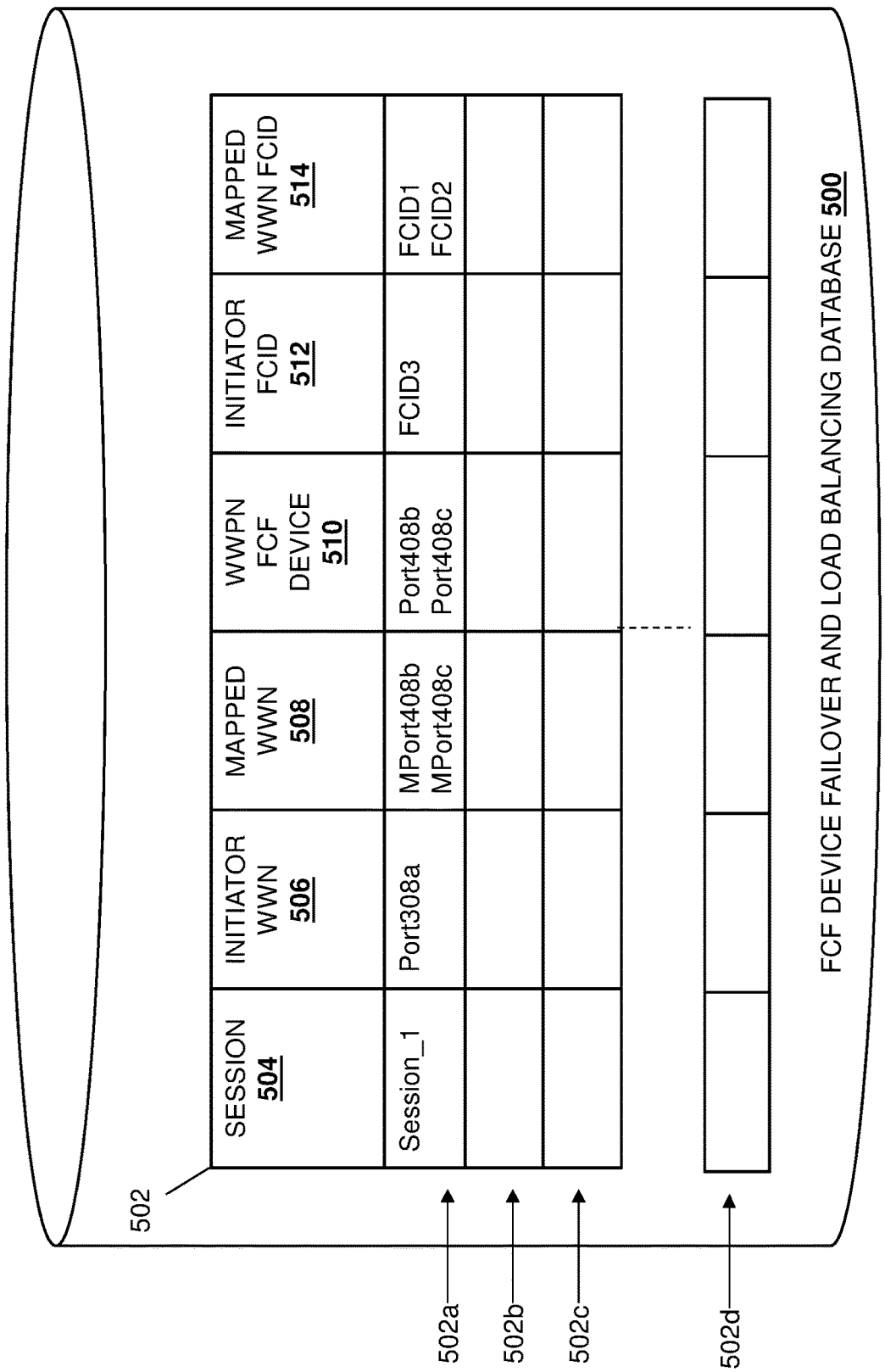
FIG. 10A is a schematic view illustrating an embodiment of information being provided in the FCF device database of FIG. 5 during the method of FIG. 8.

The method 800 begins at block 802 where an FCF device link mapping table is generated. In an embodiment of block 802 and with reference to a FCF device failover and load balancing system communication diagram 900 illustrated in FIG. 9, the embodiment of the FCF device failover and load balancing database 500 illustrated in FIG. 10A, and the embodiment of the FC networking device zoning database 700 illustrated in FIG. 10b, the FCF device failover and load balancing engine 405 in the FCF device 400 may generate one or more FCF device link mapping tables 502 for mapping a link (e.g., the link 203) between the initiator device 202 and the FCF device 204 with proxied links (e.g., the link 205a and the link 205b) between the FCF device 204 and the FC networking device 206. For example, and with reference to the FCF device failover and load balancing system communication diagram 900 illustrated in FIG. 9 and the FCF device failover and load balancing system 200 illustrated in FIG. 2, at step 902 the initiator device 202 may provide a Fabric Login (FLOGI) to the FCF device 204 through a physical node port (PN_port) (e.g., the port 308a) via the link 203 and to a physical fiber port (PF_Port) (e.g., the port 408a) included on the FCF device 204. As would be appreciated by one of skill in the art in possession of the present disclosure, a FLOGI may include a port identifier (e.g., a World Wide Port Name (WWPN)) that identifies the port from which the FLOGI originated, and a node identifier (e.g., a World Wide Node Name (WWNN)) that identifies the node (e.g., initiator device) from which the FLOGI originated.

The FCF device failover and load balancing engine 405 of the FCF device 204 may snoop the FLOGI received from the initiator device 202 at step 902, and retrieve at least the port identifier (e.g., WWPN) of the port 308a included on the initiator device 202. The FCF device failover and load balancing engine 405 may store the port identifier in the initiator WWN column 506 of the FCF device link mapping table entry 502a in the FCF device link mapping table 502 as "port308a," which one skill in the art in possession of the present disclosure will recognize may be the WWPN of the port 308a of the initiator device 202.

The FCF device failover and load balancing engine 405 may then generate proxy links between the FCF device 204 and the FC networking device 206 for data traffic originating from the port 308a. Prior to receiving the FLOGI at step 902, the FCF device 204 may have performed FC fabric login of its ports to the FC networking device 206 by providing a FLOGI on each of those ports (e.g., the ports 408b-408d), and receiving a FLOGI ACC such that each of those ports establishes a link with the FC networking device 206. For example, the port 408b on the FCF device 204 may establish the link 205a with the port 608a on the FC networking device 206, the port 408c on the FCF device 204 may establish the link 205b with the port 608b on the FC networking device 206, and the port 408d on the FCF device 204 may establish the link 205c with the port 608c on the FC networking device 206. In addition, prior to receiving the FLOGI, the FCF device 204 may have been configured by an administrator to provide a predefined number of proxied uplinks between the FCF device 204 and the FC networking device 206 when an initiator device initiates a Fibre Channel login. For example, a configuration file stored in the FCF device failover and load balancing database 500 may indicate the number of proxied links to be provided per initiator device link. Specifically, the configuration file may indicate that there should be two FCF device-to-FC networking device links per initiator device link. However, other values may be configured in the configuration file (e.g., three links, four links, etc.) In other embodiments, the configuration file may indicate an FCF device-to-FC networking device link condition that should to be satisfied when the FCF device-to-FC networking device links are selected. For example, FCF device-to-FC networking device links to be mapped to a link between the FCF device and the initiator device may be selected based on bandwidth, speed, number of proxied links already established on each of the FCF device-to-FC networking device links, and/or any other link properties that would be apparent to one of skill in the art in possession of the present disclosure. In yet other embodiments, the configuration file may explicitly define which FCF device-to-FC networking device links are to be used as proxy links for the link 203 between the initiator device 202 and the FCF device 204.

Based on the instructions and conditions defined by the configuration file, the FCF device 204 may select links from the links 205a-205c that are to be used as proxy links for the link 203. In the illustrated example in FIG. 9, the links 205a and 205b are selected as proxy links, while the link 205c is not selected or used as a proxy link. The FCF device failover and load balancing engine 405 then generates a mapped WWN for the link 205a and a mapped WWN for the link 205b, and associates the mapped WWNs with the port identifier of the port 308a that provides the link 203. For example, the mapped WWN for the link 205a may be derived from the port identifier (e.g., WWPN) for the port 408b that provides the link 205a with the port 608a on the FC networking device 206. Similarly, the mapped WWN for the link 205b may be derived from the port identifier (e.g., WWPN) for the port 408c that provides the link 205b with the port 608b of the FC networking device 206. The FCF device failover and load balancing engine 405 may store the mapped port identifier for the port 408b in the mapped WWN column 508 of the FCF device link mapping table entry 502a in the FCF device link mapping table 502 as "mport408b," which one skill in the art in possession of the present disclosure will recognize may be the mapped WWPN of the port 408b of the FCF device 204.

Similarly, the FCF device failover and load balancing engine 405 may store the mapped port identifier for the port 408c in the mapped WWN column 508 of the FCF device link mapping table entry 502a in the FCF device link mapping table 502 as "mport408c," which one skill in the art in possession of the present disclosure will recognize may be the mapped WWPN of the port 408c of the FCF device 202. In addition, the FCF device failover and load balancing engine 405 may store the port identifier for the port 408b in the WWPN FCF device column 510 of the FCF device link mapping table entry 502a in the FCF device link mapping table 502 as "port408b," which one skill in the art in possession of the present disclosure will recognize may be the WWPN of the port 408b of the FCF device 204. Furthermore, the FCF device failover and load balancing engine 405 may store the port identifier for the port 408c in the WWPN FCF device column 510 of the FCF device link mapping table entry 502a in the FCF device link mapping table 502 as "port408c," which one skill in the art in possession of the present disclosure will recognize may be the WWPN of the port 408c of the FCF device 204.

At step 904, the FCF device failover and load balancing engine 405 may then send a Fabric Discovery message (FDISC) on each of the links between the FCF device 204 and the FC networking device 206 that are mapped to the link between the initiator device 202 and the FCF device 204. For example, the FCF device failover and load balancing engine 405 may provide a first FDISC via the link 205a, and a second FIDSC via the link 205b. The first FDISC may include the node identifier for the FCF device 204 and the mapped port identifier for the port 408b (e.g., the mapped WWN "mport408b"), and the second FDISC may include the node identifier for the FCF device 204 and the mapped port identifier for the port 408c (e.g., the mapped WWN "mport408b").

The FC networking device 206 receives the first FDISC on port 608a and the second FDISC on port 608b, and may then log in the mapped port identifier for the port 408b, and log in the mapped port identifier for the port 408c. At step 906, the FC networking device may then provide a first FDISC ACC to the FCF device 204 via the link 205a and in response to the first FDISC, and provide a second FDISC ACC to the FCF device 204 via the link 205b and in response to the second FDISC. The first FDISC ACC may include a first Fiber Channel Identifier (FCID) assigned to the mapped port identifier for the port 408b, and the second FDISC ACC may include a second FCID assigned to the mapped port identifier for the port 408c.

The FCF device 204 may receive the first FDISC ACC on port 408b and the second FDISC ACC on port 408c, and the FCF device failover and load balancing engine 405 may snoop the first FDISC ACC, retrieve the first FCID, and associate the first FCID with the mapped WWN for port 408b. For example, the FCF device failover and load balancing engine 405 may store the first FCID identifier for the port 408b in the mapped WWN FCID column 514 of the FCF device link mapping table entry 502a in the FCF device link mapping table 502 as "FCID1." Similarly, the FCF device failover and load balancing engine 405 may store the second FCID identifier for the port 408c in the mapped WWN FCID column 514 of the FCF device link mapping table entry 502a in the FCF device link mapping table 502 as "FCID2." The FCF device failover and load balancing engine 405 may then generate an third FCID and associate that third FCID with the first FCID and the second FCID and, at step 908, provide that third FCID to the initiator device 202 via the link 203. For example, the FCF device failover and load balancing engine 405 may store the third FCID identifier for the port 308a in the initiator FCID column 512 of the FCF device link mapping table entry 502a in the FCF device failover and load balancing mapping table 502 as "FCID3." As such, a session is created (e.g., "Session1", as indicated in the session column of the FCF device link mapping table entry 502a in the FCF device link mapping table 502 in FIG. 10A), and that session associates the FCID, which is assigned to the port 308a of the initiator device 202 that provides link 203, with the FCIDs that are assigned to the mapped WWNs associated with the ports 408b and 408c that provide the links 205a and 205b, respectively. As discussed below, the FCF device 204 may use the FCF device link mapping table 502 to load balance traffic received from the initiator device 202 on multiple links between the FCF device 204 and the FC networking device 206 and, if one of those links goes down, the FCF device 204 may maintain the session by utilizing the remaining links in that session.

The FCF device 204 may use the FCF device link mapping table 502 to replace source identifiers associated with subsequent Fibre Channel login messages with those associated with the mapped WWNs of the proxied ports. Similarly, the FCF device 204 may use the FCF device link mapping table 502 to replace destination identifiers associated with subsequent Fibre Channel login responses with those associated with the WWN of the port 308a of the initiator device 202. For example, at step 912, the initiator device 202 sends a Port Login (PLOGI) via the link 203, and the FCF device 204 may snoop the PLOGI to obtain WWN of the port 308a. The FCF device 204 may then use the WWN of the port 308a and the FCF device link mapping table 502 to determine that there are proxy links provided by links 205a and 205b. The FCF device 204 may then modify the WWN of the port 308a in the PLOGI by replacing it with the mapped WWN of the proxied port 408b, and at step 914 may provide a first proxied PLOGI (that includes the mapped WWN of the proxied port 408b) to the FC networking device via the link 205a. Similarly, the FCF device 204 may modify the WWN of the port 308a in the PLOGI by replacing it with the mapped WWN of the proxied port 408c, and at step 914 may provide a second proxied PLOGI that includes the mapped WWN of the proxied port 408c to the FC networking device via the link 205b.

The FC networking device 206 may then perform the port login to the name server for each of the mapped WWNs and, at step 916, may provide the PLOGI responses over the link 205a and the link 205b. The PLOGI response on link 205a may include the mapped WWN of the proxied port 408b as the destination identifier, and the PLOGI response on the link 205b may include the mapped WWN of the proxied port 408c as the destination identifier. The FCF device failover and load balancing engine 405 may snoop the PLOGI responses and maintain any information obtained from the PLOGI responses with the information provided in the FCF device link mapping table 502. The FCF device failover and load balancing engine 405 may also retrieve the mapped WWN from each PLOGI response, and use those mapped WWNs and the FCF device link mapping table 502 to determine that those mapped WWNs are associated with the WWN for the port 308a on the initiator device 202. The FCF device failover and load balancing engine 405 may then create a single PLOGI response that is based on the proxied PLOGI responses and that includes the initiator device identifier (e.g., the WWN for the port 308a) as the destination device identifier, and send that PLOGI response to the initiator device 202, at step 918.

One of skill in the art will recognize that the steps 912-918 may be repeated for name server registration and name server queries originating from the initiator device 202 and destined for the FC networking device 206. As such, the FCF device failover and load balancing engine 405 may snoop those requests and generate proxied requests on links 205a and 205b. The load balancing engine 405 may receive a proxied response on each link 205a and 205b in response to the proxied requests, snoop and store information from those proxied responses, and provide a single response to the initiator device 202. As would be appreciated by one of skill in the art, after fabric login, the initiator device 202 must register itself with the Fibre Channel Name Server (FCNS) provided on the FC networking device 206 by providing a record of its FCID, WWPN, WWNN, and FC-4 capabilities (FCP or IP, for example). Finally, the initiator device 202 may issue a query to the name server requesting database records of other registered nodes which meet a certain criteria. For example, in the case of a SCSI initiator node, the query might contain a request for the name server to return entries for which the capabilities field contains "scsi-fcp target". The retrieval of this record (or records, if more than one meets the criteria) provides the initiator device 202 with the information necessary to initiate a conversation with the target device. Specifically, WWNs are used for identification, and the FCID is used to build the Fibre Channel frames which are ultimately sent in the network. As such, same FC4 specific details are registered for all mapped WWNs. For example, in name server registrations such as, for example, RFF_ID, the name server registrations may be snooped and the source FCID, as well as the port identifier object in the CT_IU, may be modified with the FCID linked to the mapped WWN. This may be repeated for the any additional FCIDs linked to another mapped WWN, and similar processing will be done for other name serve registrations.

After the port login and name server registration and query has been completed between the initiator device 202 and the FC networking device 206, the initiator device 202 may send additional FC login messages to the target device 208. For example, at step 920, the initiator device 202 sends a target PLOGI via the link 203. As would be understood by one of skill in the art, the target PLOGI is used to exchange node-to-node parameters specific to the initiator device 202 and target device 208 pair. The FCF device 204 may snoop the target PLOGI to obtain WWN of the port 308a, and may use the WWN of the port 308a and the FCF device link mapping table 502 to determine that there are proxy links on links 205a and 205b that are associated with the WWN of the port 308a. The FCF device 204 may then modify the WWN of the port 308a in the target PLOGI by replacing it with the mapped WWN of the proxied port 408b, and at step 922 may provide a first proxied target PLOGI (that includes the mapped WWN of the proxied port 408b) to the FC networking device via the link 205a. Similarly, the FCF device 204 may modify the WWN of the port 308a in the target PLOGI by replacing it with the mapped WWN of the proxied port 408c, and at step 922 may provide a second proxied target PLOGI (that includes the mapped WWN of the proxied port 408c) to the FC networking device 206 via the link 205b.

Figure 10B:
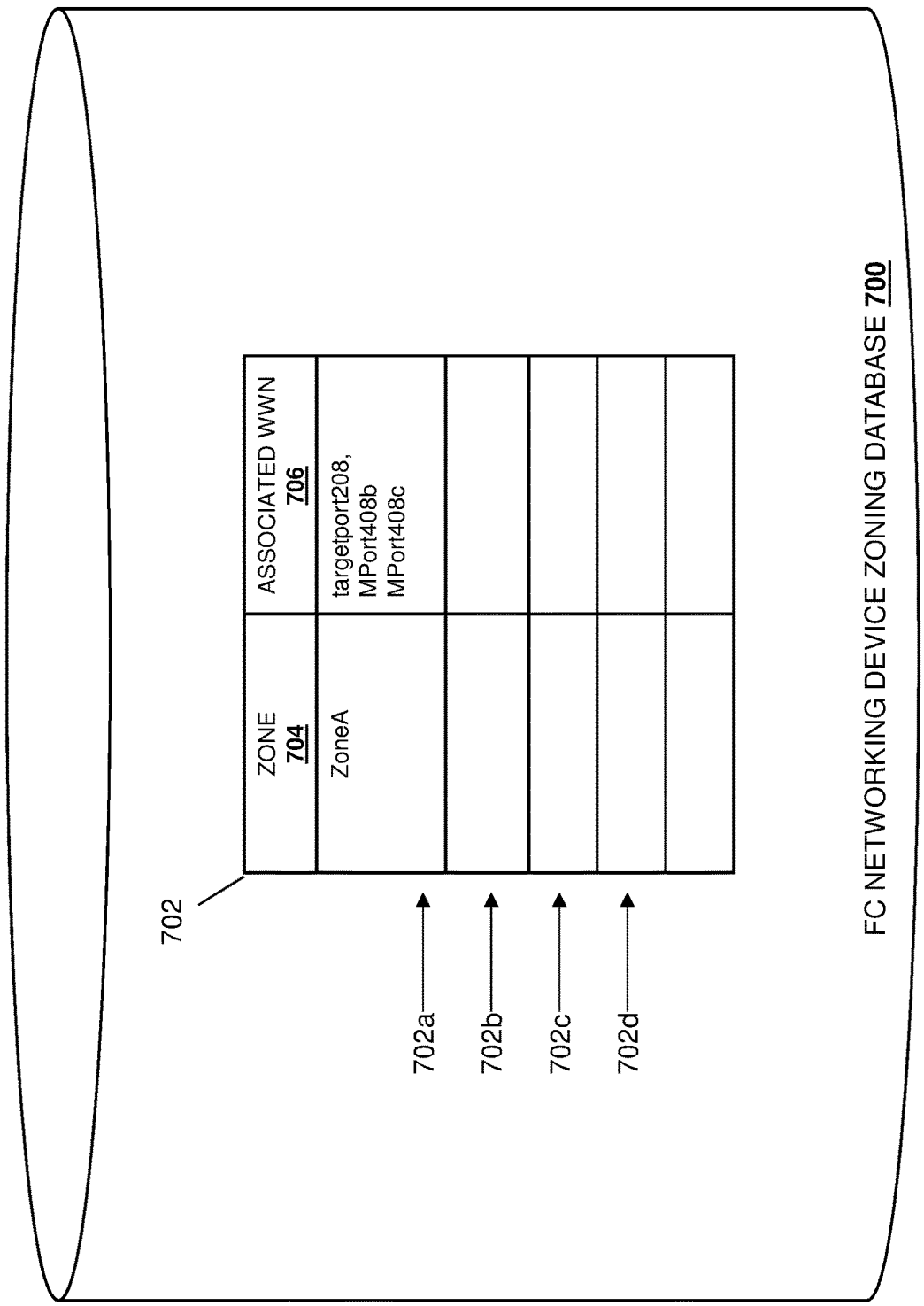
FIG. 10B is a schematic view illustrating an embodiment of information being provided in the FC networking device zoning database of FIG. 7 during the method of FIG. 8.

The FC networking device 206 may then use the FC networking device zoning table 702 of the FC networking device zoning database 700, illustrated in FIG. 10B, to determine whether the mapped WWNs can communicate with the target device 208 that is identified in each of the first proxied target PLOGI and the second proxied target PLOGI. As illustrated in FIG. 10B, FC networking device zoning table entry 702a indicates that "Zone1" includes target device 208, as indicated by target device indicator "targetport208" (e.g., a target device WWN) and the mapped WWNs ("mport408b" and "mport408c"). As such, the FC networking device may recognize that the mapped WWNs that are in the source information of the first proxied target PLOGI and the second proxied target PLOGI are in the same zone as the target device 208. At step 924, the FC networking device 206 may then forward the first proxied target PLOGI and the second proxied target PLOGI over the link 207 between port 608c and a port on the target device 208. The target device 208 may process the first proxied target PLOGI and the second proxied target PLOGI and, at step 926, the target device 208 may return a first target PLOGI response in response to the first proxied target PLOGI, and return a second target PLOGI response in response to the second proxied target PLOGI via the link 207.

The FC networking device 206 may receive the first target PLOGI response and the second target PLOGI response and process the first target PLOGI response and the second target PLOGI response. At step 928, the FC networking device may forward the first target PLOGI response via the link 205a to the FCF device 204, and forward the second target PLOGI response via the link 205b to the FCF device 204. The FCF device failover and load balancing engine 405 may snoop the first and second PLOGI responses and maintain any information obtained from the first and second PLOGI responses with the information provided in the FCF device link mapping table 502. The FCF device failover and load balancing engine 405 may then retrieve the mapped WWN from each target PLOGI response, and use those mapped WWNs and the FCF device link mapping table 502 to determine that those mapped WWNs are associated with the WWN for the port 308a on the initiator device 202. The FCF device failover and load balancing engine 405 may then create a single target PLOGI response that is based on the proxied target PLOGI responses and that includes the initiator device identifier (e.g., the WWN for the port 308a) as the destination device identifier and, at step 930, send that PLOGI response to the initiator device 202.

One of skill in the art will recognize that the steps 920-930 may be repeated for process login (PRLI) operations for the process at the target device 208 with which the initiator device 202 wants to converse. For example, in the case of a SCSI node, the PRLI is performed by the initiator device 202 against an SCSI-FCP process in the target device 208. The standards refer to this operation as "establishing an FC-4 image pair". As such, when the FCF device 204 receives the PLRI from the initiator device 202 via the link 203 at step 920, the FCF device failover and load balancing engine 405 may snoop those requests and generate proxied PLRIs on links 205a and 205b at step 922. The FC networking device 206 may then forward the proxied PLRIs via the link 207 to the target device at step 924. The target device 208 may then process the proxied PRLIs, and return proxied PRLI responses to the FC networking device 206 via the link 207 at step 926. At step 928, the FC networking device 206 may forward the proxied PRLI responses to the FCF device 204 via the links 205a and 205b and according to the destination identifiers in each of the proxied PRLI responses, which may include one of the mapped WWNs. The FCF device failover and load balancing engine 405 may then receive a proxied PRLI response on each link 205a and 205b in response to the proxied PRLI requests, snoop and store information from those responses, update the destination identifier in the proxied PRLI response with the initiator device identifier (e.g., initiator WWN) and, at step 930, provide a single PRLI response to the initiator device 202. After FC login operations are performed, the initiator device 202 may communicate traffic (e.g., SCSI traffic) with the target device 208.

The method 800 then proceeds to block 804 where traffic is received from an initiator device at an FCF device port that is coupled to the initiator device. In an embodiment, at block 804, the initiator device 202 may provide traffic (e.g., SCSI exchanges) that is addressed to the target device 208 to the FCF device 204. In various embodiments, the traffic may include an initiator device identifier (e.g., an FCID of the initiator device 202) and a target device identifier (e.g., an FCID of the target device 208). For example, and with reference to the FCF device failover and load balancing diagram 1100a illustrated in FIG. 11A, the initiator device 202 may provide traffic to the FCF device 204 via the link 203 that is destined for the target device 208, as illustrated by the traffic route 1102.

The method 800 then proceeds to block 806 where the traffic from the initiator device is forwarded on a first proxy link and a second proxy link to an FCF networking device. In an embodiment, at block 806, the FCF device failover and load balancing engine 405 of the FCF device 204 may provide the traffic on the link 205a and the link 205b to the FC networking device 206. For example, the FCF device failover and load balancing engine 405 may snoop the traffic received to retrieve or identify the source identifier. Continuing with the example above, the source identifier for the initiator device 202 may be "FCID3", and the FCF device failover and load balancing engine 405 may reference the FCF device link mapping table 502 in the FCF device failover and load balancing database 500 illustrated in FIG. 10A and determine that the source identifier "FCID3" matches the initiator identifier "FCID3" in FCF device link mapping table entry 502a and the initiator FCID column 512. The FCF device failover and load balancing engine 405 may then determine that "FCID3" is mapped to the proxied initiator device identifiers (e.g., the mapped WWN FCIDs ("FCID1" and "FCID2")), which are mapped to link 205a and link 205b, respectively. The FCF device failover and load balancing engine 405 may then determine which portion of the traffic to hash between the link 205a and the link 205b. For example, the FCF device failover and load balancing engine 405 may hash the traffic from the initiator device 202 between the links 205a and 205b based on the originator exchange identifier (OX_ID) included in each traffic frame that identifies each SCSI exchange between the initiator device 202 and the target device 208. as will be appreciated by one of skill in the art in possession of the present disclosure, because the {OX_ID, source identifier (SID)} pair is different for each link 205a and 205b, integrity of exchanges will be maintained. However, one of skill in the art in possession of the present disclosure will recognize that other hashing and/or load balancing techniques may be used to hash and/or load balance the traffic between the link 205a and the link 205b. The FCF device failover and load balancing engine 405 may also replace the source identifier "FCID3" in the portion of the traffic that is to be sent on link 205a with the source identifier "FCID1", and forward that portion of the traffic on the link 205a to the FC networking device 206. Similarly, the FCF device failover and load balancing engine 405 may also replace the source identifier "FCID3" in the portion of the traffic that is to be sent on link 205b with the source identifier "FCID2", and forward that portion of the traffic on the link 205b to the FC networking device 206.

Figure 11A:
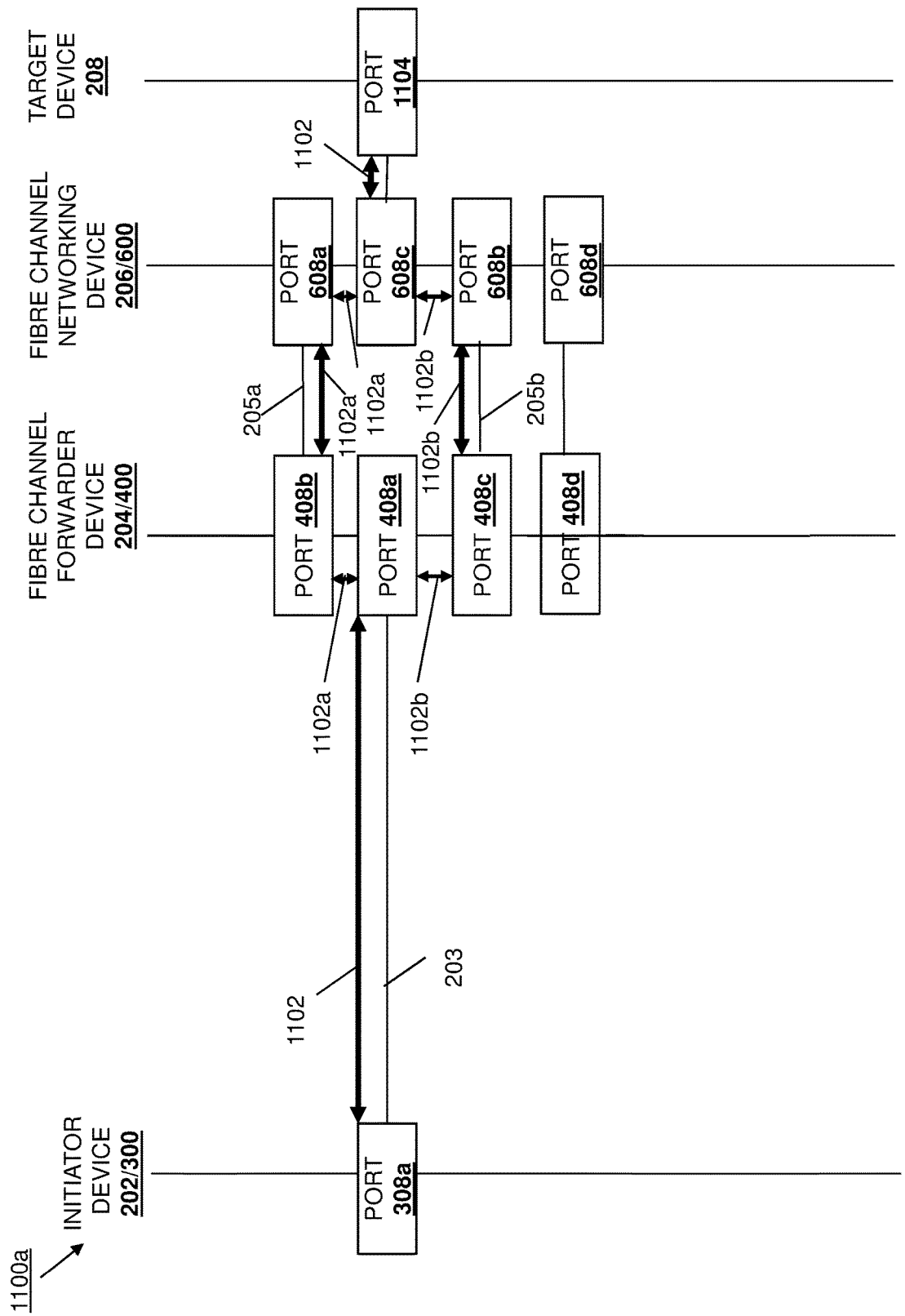
FIG. 11A is a diagram illustrating an embodiment of FCF device failover and load balancing operations being performed during the method of FIG. 8.

As illustrated in FIG. 11A, the FCF device 204 may receive the traffic from the initiator device 202 on port 408a, as illustrated by the traffic route 1102. The FCF device 204 may then hash the traffic between the ports 408b and 408c that provide the links 205a and 205b, respectively, as illustrated by the traffic route 1102a and 1102b. The FCF device 204 may then forward the portion of the traffic for port 408b along the link 205a to the FC networking device 206, as illustrated by traffic route 1102a. Similarly, the FCF device 204 may forward the portion of the traffic for port 408c along the link 205b to the FC networking device 206, as illustrated by traffic route 1102b. The FC networking device 206 may then forward the traffic received at the port 608a and the port 608b to the target device 208 via the link 207 between the port 608c and a port 1104 included on the target device 208. In various embodiments, the target device 208 may provide traffic back to the initiator device 202 in response to the receiving the traffic as discussed above. However, instead of inserting the initiator device identifier for the initiator device 202 as the destination identifier in the header of that traffic, the proxied FCIDs for the mapped WWNs may instead be utilized for the respective portions of traffic.

For example, response exchanges for the traffic may result in the target device 208 assigning FCID1 as the destination identifier in a portion of the traffic, and the target device 208 assigning FCID2 as the destination identifier in another portion of the traffic. When the FCF device 204 receives the traffic from the FC networking device 206 via the links 205a and 205b, the FCF device 204 will snoop the packet header for the destination address and determine, using the FCF device link mapping table 502 that the destination address in the received traffic (e.g., FCID1 or FCID2) is mapped to the initiator device identifier for the initiator device 202. As such, the FCF device failover and load balancing engine 405 may replace the destination identifier in the traffic received from the target device 208 with the initiator device identifier (e.g., "FCID3"). The FCF device 204 may then forward that traffic from the target device 208 to the initiator device 202 via the link 203, as indicated by the traffic route 1102 illustrated in FIG. 11A.

The method 800 may then proceed to block 808 where it is determined whether one of the links between the FCF device and the FC networking device that provides the proxied ports has failed or otherwise has become unavailable. In an embodiment, at block 808, the FCF device failover and load balancing engine 405 may determine whether one of the links between the FCF device 204 and the FC networking device 206 that are mapped to the link between the initiator device 202 and the FCF device 204 have failed or have otherwise become unavailable. For example, the FCF device failover and load balancing engine 405 may determine whether one of the link 205a or the link 205b have failed or have otherwise become unavailable. If the links have not failed or have otherwise become unavailable, the method 800 may proceed back to block 806. However, if one of the links has failed or have otherwise become unavailable, then the method 800 may proceed to decision block 810 where it is determined whether all of the links between the FCF device and the FCF networking device that are mapped to the link to the initiator device have failed or have otherwise become unavailable. In an embodiment, at block 808, the FCF device failover and load balancing engine 405 may determine whether all of the links between the FCF device 204 and the FC networking device 206 that are mapped to the link between the initiator device 202 and the FCF device 204 have failed or have otherwise become unavailable. For example, the FCF device failover and load balancing engine 405 may determine whether both of the link 205a and the link 205b have failed or have otherwise become unavailable.

Figure 11B:
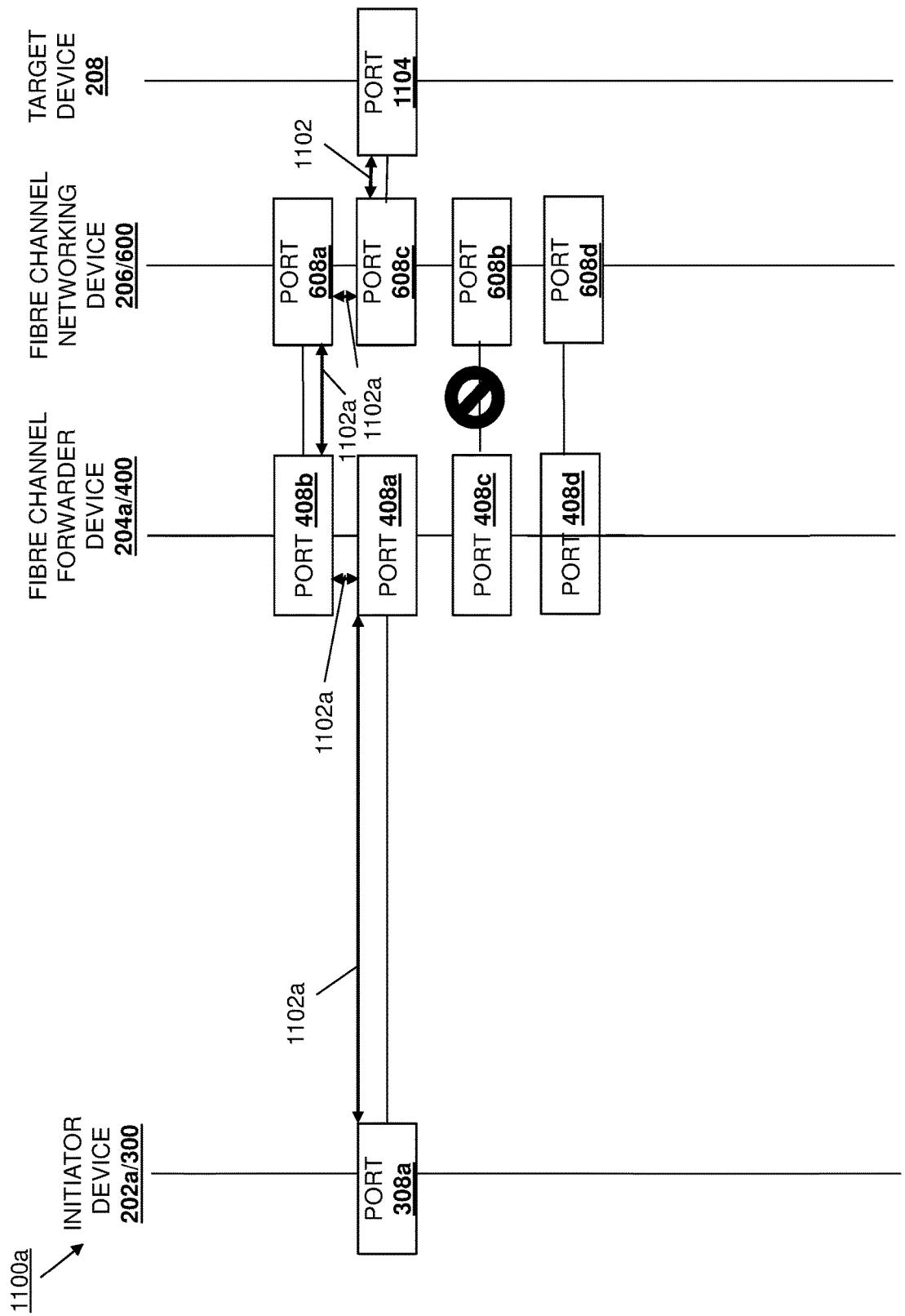
FIG. 11B is a diagram illustrating an embodiment of FCF device failover and load balancing operations being performed during the method of FIG. 8.

If both of the links 205a and 205b have not failed or have otherwise become unavailable, the method 800 may proceed back to block 812 where the traffic is forwarded on the remaining links between the FCF device 204 and the FC networking device 206 that are mapped to the link between the initiator device 202 and the FCF device 204. For example, and referring to FIG. 11B, the link 205b between port 408c on the FCF device 204 and the port 608b on the FC networking device 206 may become unavailable. As discussed above, the traffic originating from the initiator device 202 may then be hashed between the remaining links between the FCF device 204 and the FC networking device 206 that are mapped to the link between the initiator device 202 and the FCF device 204. In the example illustrated in FIG. 11B, only the link 205a remains, and the traffic may be provided on that link. In various embodiments, once a link between the FCF device 204 and the FC networking device 206 that is mapped to the link between the initiator device 202 and the FCF device 204 fails or otherwise becomes unavailable, the mappings for that link are removed from the FCF device link mapping table 502. In conventional systems, once the link between the FCF device 204 and the FC networking device 206 fails or otherwise becomes unavailable, the entire session is torn down and the initiator device 202 may be required to perform the entire FC login processes again.

If, at decision block 810, it is determined that all of the links that are between the FCF device and the FCF networking device and that are mapped to the link between the initiator device and the FCF device fail or otherwise become unavailable, then the method 800 proceeds to block 814 where the session between the initiator device and the target device is torn down. In an embodiment, at decision block 810, if it is determined that all of the links that are between the FCF device 204 and the FC networking device 206 and that are mapped to the link between the initiator device 202 and the FCF device 204 fail or otherwise become unavailable, then the method 800 proceeds to block 814 where the session between the initiator device 202 and the target device 208 is torn down. For example, the FCF device link mapping table entry 502a may be removed from the FCF device link mapping table 502.

In various embodiments, if the session is still alive (e.g., in that at least one of the links that is between the FCF device 204 and the FC networking device 206 and that are mapped to the link between the initiator device 202 and the FCF device 204 is still available) and one of the links that failed or became unavailable subsequently recovers, a failback mechanism may be performed to reestablish the failed link in the FCF device link mapping table 502 such that the traffic between the initiator device 202 and the target device 208 may be hashed on that link.

Thus, systems and methods have been described that provide for FCF device link failover and load balancing. The traffic between an initiator device and target device that is included in an FC SAN may be load balanced on a plurality of links that are provided between an FCF device and an FC device and that are mapped to a link between the FCF device and an initiator device. If one of the links fails, the FCF device may use the FCF device link mapping table to route the traffic on the remaining links that are mapped to the link between the FCF device and the initiator device. Using the FCF device to create proxied links for the link between the FCF device and the initiator device, and modifying the traffic received and transmitted at the FCF device in such a manner, decreases latency of the traffic being sent, alleviates congestion on the links between the FC networking device and the FCF device, utilizes bandwidth more efficiently, and provides other benefit that would be apparent to one of skill in the art in possession of the present disclosure.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Fibre Channel Forwarder (FCF) failover and load balancing system, comprising:
   a Fibre Channel (FC) networking device;
   an initiator device;
   a target device coupled to the FC networking device via a first link; and
   a Fibre Channel Forwarder (FCF) device that is coupled to:
      the initiator device via a second link;
      the FC networking device via a third link that is mapped to the second link; and
      the FC networking device via a fourth link that is mapped to the second link, wherein the FCF device is configured to:
         receive, via the second link, a fabric login (FLOGI) from the initiator device;
         determine that the third link and the fourth link should be proxied for the second link;
         transmit a first proxied FDISC on the third link to the FC networking device and a second proxied FDISC on the fourth link to the FC networking device;
         receive a first FDISC response on the third link that includes a first FC identifier (FCID), and a second FDISC response on the fourth link that includes a second FCID;
         transmit, via the second link, a FLOGI response that includes a third FCID that is mapped to the first FCID and the second FCID in a link mapping table;
         receive, via the second link, first traffic that originates from the initiator device and that is addressed to the target device;
         determine, using the third FCID included in the first traffic and the link mapping table, that the third link and the fourth link are mapped to the second link on which the first traffic was received; and
         load balance the first traffic between the third link and the fourth link.

2. The system of claim 1, wherein the third link and the fourth link provide different data transmission speeds.

3. The system of claim 1, wherein the FCF device is configured to:
   generate a first mapped World Wide Name (WWN) for the first proxied FDISC;
   generate a second mapped WWN for the second proxied FDISC; and
   generate the link mapping table that maps the first mapped WWN and the second mapped WWN to an initiator WWN.

4. The system of claim 3, wherein the first mapped WWN is derived from a first World Wide Port Name (WWPN) for a first node port that is included on the FCF device and that provides the third link, and wherein the second mapped WWN is derived from a second WWPN for a second node port that is included on the FCF device and that provides the fourth link.

5. The system of claim 3, wherein the FC networking device maintains a zoning configuration with the first mapped WWN, the second mapped WWN, and a target WWN for the target device.

6. The system of claim 3, wherein the FCF device is configured to:
   snoop an FC login message that is received on the second link subsequent to the FLOGI;

modify a source identifier of the FC login message using the linking mapping table to include the first mapped WWN as the source identifier in a first proxied FC login message, and to include the second mapped WWN as the source identifier in a second proxied FC login message;

provide the first proxied FC login message on the third link and the second proxied FC login message on the fourth link;

receive a first proxied FC login response on the third link that includes the first mapped WWN as a destination identifier and a second proxied FC login response on the fourth link that includes the second mapped WWN as the destination identifier;

snoop first FC login information from the first proxied FC login response and second FC login information from the second proxied FC login response;

store the first FC login information and the second FC login information in the link mapping table; and provide, via the second link, a third FC login response that is generated using the first FC login information, the second FC login information, and includes the initiator WWN as the destination identifier.

7. The system of claim 1, wherein the FCF device is configured to:
determine that the third link has failed; and
provide the first traffic on the fourth link.

8. An Information Handling System (IHS), comprising:
a communication subsystem that is coupled to:
an initiator device via a first link;
a Fibre Channel (FC) networking device via a second link that is mapped to the first link; and
the FC networking device via a third link that is mapped to the first link;
a processing system coupled to the communication subsystem; and
a memory system that is coupled to the processing system and that includes instructions that, when executed by the processing system, cause the processing system to provide a failover and load balancing engine that is configured to:
receive, via the first link, a fabric login (FLOGI) from the initiator device;
determine that the second link and the third link should be proxied for the first link;
transmit a first proxied FDISC on the second link to the FC networking device and a second proxied FDISC on the third link to the FC networking device;
receive a first FDISC response on the second link that includes a first FC identifier (FCID) and a second FDISC response on the third link that includes a second FCID;
transmit, via the first link, a FLOGI response that includes a third FCID that is mapped to the first FCID and the second FCID in a link mapping table;
receive, via the first link, first traffic that originates from the initiator device and that is addressed to a target device coupled to the FC networking device via a fourth link;
determine, using the third FCID included in the first traffic and the link mapping table, that the second link and the third link are mapped to the first link on which the first traffic was received; and
load balance the first traffic between the second link and the third link.

9. The IHS of claim 8, wherein the failover and load balancing engine is configured to:
generate a first mapped World Wide Name (WWN) for the first proxied FDISC;
generate a second mapped WWN for the second proxied FDISC; and
generate the link mapping table that maps the first mapped WWN and the second mapped WWN to an initiator WWN.

10. The IHS of claim 9, wherein the first mapped WWN is derived from a first World Wide Port Name (WWPN) for a first node port that is included on the communication subsystem and that provides the second link, and wherein the second mapped WWN is derived from a second WWPN for a second node port that is included on the communication subsystem and that provides the third link.

11. The IHS of claim 9, wherein the failover and load balancing engine is configured to: snoop an FC login message that is received on the first link subsequent to the FLOGI;
modify a source identifier of the FC login message using the linking mapping table to include the first mapped WWN as the source identifier in a first proxied FC login message, and to include the second mapped WWN as the source identifier in a second proxied FC login message;
provide the first proxied FC login message on the second link and the second proxied FC login message on the third link;
receive a first proxied FC login response on the second link that includes the first mapped WWN as a destination identifier and a second proxied FC login response on the third link that includes the second mapped WWN as the destination identifier;
snoop first FC login information from the first proxied FC login response and second FC login information from the second proxied FC login response;
store the first FC login information and the second FC login information in the link mapping table; and
provide, via the second link, a third FC login response that is generated using the first FC login information, the second FC login information, and includes the initiator WWN as the destination identifier.

12. The IHS of claim 8, wherein the failover and load balancing engine is configured to:
determine that the second link has failed; and
provide the first traffic on the third link.

13. A method providing uplink failover, comprising:
receiving, by a Fibre Channel Forwarder (FCF) device via a first link coupled to an initiator device, a fabric login (FLOGI) from the initiator device;
determining, by the FCF device, that a second link that couples the FCF device to a Fibre Channel (FC) networking device and a third link that couples the FCF device to the FC networking device should be proxied for the first link;
transmitting, by the FCF device, a first proxied FDISC on the second link to the FC networking device and a second proxied FDISC on the third link to the FC networking device;
receiving, by the FCF device, a first FDISC response on the second link that includes a first FC identifier (FCID), and a second FDISC response on the third link that includes a second FCID;

transmitting, by the FCF device and via the first link, a FLOGI response that includes a third FCID that is mapped to the first FCID and the second FCID in a link mapping table;

receiving, by the FCF device via the first link coupled to the initiator device, first traffic that originates from the initiator device and that is addressed to a target device coupled to the FC networking device via a fourth link;

determining, by the FCF device using the third FC included in the first traffic and the link mapping table, that the second link that couples the FCF device to the FC networking device and the third link that couples the FCF device to the FC networking device are mapped to the first link on which the first traffic was received; and routing, by the FCF device, a first portion of the first traffic on the third link and a second portion of the first traffic on the fourth link.

14. The method of claim 13, further comprising:

generating, by the FCF device, a first mapped World Wide Name (WWN) for the first proxied FDISC;

generating, by the FCF device, a second mapped WWN for the second proxied FDISC; and generating, by the FCF device, the link mapping table that maps the first mapped WWN and the second mapped WWN to an initiator WWN.

15. The method of claim 14, wherein the first mapped WWN is derived from a first World Wide Port Name (WWPN) for a first node port that is included on the FCF device and that provides the second link, and wherein the second mapped WWN is derived from a second WWPN for a second node port that is included on the FCF device and that provides the third link.

16. The method of claim 14, further comprising:

snooping, by the FCF device, an FC login message that is received on the first link subsequent to the FLOGI;

modifying, by the FCF device, a source identifier of the FC login message using the linking mapping table to include the first mapped WWN as the source identifier in a first proxied FC login message, and to include the second mapped WWN as the source identifier in a second proxied FC login message;

providing, by the FCF device, the first proxied FC login message on the second link and the second proxied FC login message on the third link;

receiving, by the FCF device, a first proxied FC login response on the second link that includes the first mapped WWN as a destination identifier and a second proxied FC login response on the third link that includes the second mapped WWN as the destination identifier;

snooping, by the FCF device, first FC login information from the first proxied FC login response and second FC login information from the second proxied FC login response;

storing, by the FCF device, the first FC login information and the second FC login information in the link mapping table; and providing, by the FCF device and via the second link, a third FC login response that is generated using the first FC login information, the second FC login information, and includes the initiator WWN as the destination identifier.

17. The method of claim 13, further comprising:

determining, by the FCF device, that the second link has failed; and providing, by the FCF device, the first traffic on the third link.

* * * * *